United States Patent [19]
Driscoll et al.

[11] Patent Number: 5,120,065
[45] Date of Patent: Jun. 9, 1992

[54] ELECTRONIC TALKING BOARD GAME

[75] Inventors: Robert W. Driscoll, Northampton; Daniel J. Marceau, Springfield, both of Mass.

[73] Assignee: Hasbro, Incorporated, Pawtucket, R.I.

[21] Appl. No.: 653,068

[22] Filed: Feb. 8, 1991

[51] Int. Cl.$^5$ ............................ A63F 3/00; G09B 7/04
[52] U.S. Cl. ................................... 273/237; 273/243; 434/169
[58] Field of Search ................ 273/237, 243; 434/169, 434/201

[56] References Cited
U.S. PATENT DOCUMENTS
4,505,682  3/1985  Thompson ........................ 434/335
4,958,837  9/1990  Russell .............................. 273/237

FOREIGN PATENT DOCUMENTS
WO90/00429  1/1990  PCT Int'l Appl. ................. 273/237

OTHER PUBLICATIONS
Popular Electronics "Computers: Monopoly Program" p. 44, May 1981.

Primary Examiner—Benjamin Layno
Attorney, Agent, or Firm—Donald Brown

[57] ABSTRACT

A talking board game having a board and an electronic computer system providing speech information to the players, and cards which can be read by the electronic computer system.

12 Claims, 5 Drawing Sheets

ELECTRONIC TALKING BOARD GAME

BACKGROUND OF THE INVENTION

This invention relates to electronic learning aids, teaching machines and electronic games. More particularly, this invention relates to electronic learning aids in the form of a game and using synthesized sounds, a game board and cards to teach the user information, such as letters in the alphabet.

Many games, toys and etc., have been produced over the years for teaching children to learn their letters, numbers, arithmetic and spell correctly, and/or learn other information. Examples of such systems are to be found in U.S. Pat. Nos. 3,584,398 and 4,516,260. Systems such as U.S. Pat. No. 4,516,260, have included voice synthesizers.

The present invention provides another way of particularly teaching children information such as letters, words, etc., in a way which combines learning with playing a competitive board game with their peers or even parents.

The preferred embodiment of the game as shown herein, combines sound for instructional purposes and pictorial cards as learning aids together with a game board. The preferred embodiment permits two to four children to play the game while learning information, such as the alphabet.

It is therefore an object of this invention to provide a new learning device, which combines teaching with a competitive board game.

It is a further object of this invention to provide a learning experience, which can be enjoyed while reinforcing learning of such information as the alphabet, words and etc.

It is yet another object of this invention to provide a board game which not only will provide voice directions and questions to the user, but will by use of a game board get the user involved in a learning situation in which each correct answer results in a reward and which ultimately will result in the user providing correct answers having the best chance of winning the game.

The foregoing objects are achieved as will be described in the brief description of the invention and as described in the description of the preferred embodiment of the invention.

BRIEF DESCRIPTION OF THE INVENTION

Figure 1:
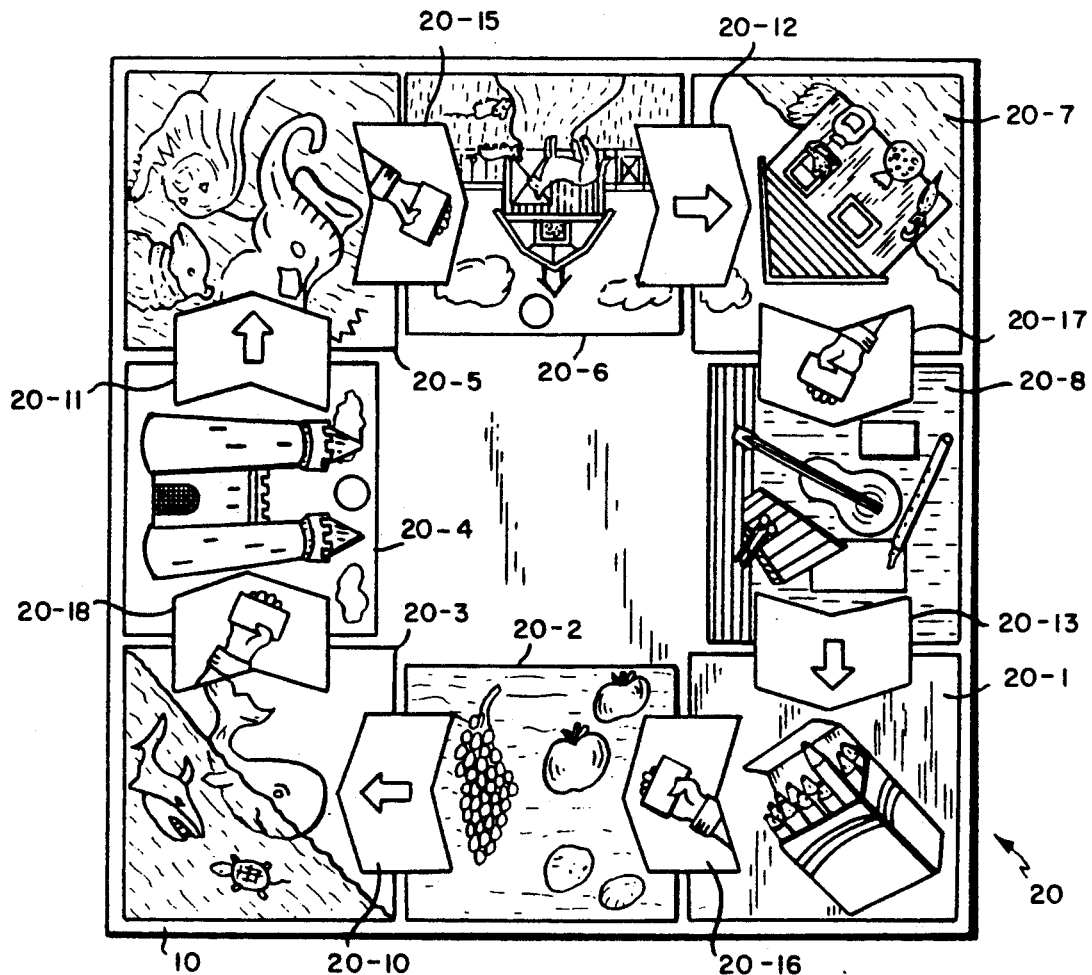
FIG. 1, represents a game board of the talking board game.

The invention comprises a playing (game) board and a computer system controlled by software as will be described with reference to the flow chart shown in the drawings The playing board in its preferred form, comprises 16 spaces: 8 location spaces, 4 move again spaces and 4 give / take a card spaces. There are 26 cards, 1 for each letter of the alphabet Each card has a picture of an item related to one of the 8 location spaces (e.g., 3 or 4 cards for each location). Each card preferably includes the name of the item. Preferably each card will carry a picture, e.g., "turtle", associated with each location. There are four playing pieces, e.g., pawns in the shape of coins, etc., (e.g., red, blue, green and yellow), one for each player. The players throughout the game will be instructed by referring to the color pawn they selected.

The computer system determines who is playing through a sign-in procedure. The computer system knows where each player is starting. The board and/or voice instructions indicates to each player where to initially place their colored pawns. The software initializes card counts for each player based on the number of players starting the game. The computer system therefore knows how many cards will be in a draw pile at the start of a game. The computer system will not know which cards each of the players have.

The computer system keeps track of the location of each player through the game play software. The computer system insures that each player stays in agreement with the software, as far as location is concerned, through the use of speech. For example, the player using a red pawn is 3 spaces away from the jungle space when the computer says "red move 3", after pausing for enough time to let the player move, the computer system through speech, asks the player if the player has landed on a space, which has items (pictorially represented on the cards, e.g., apples) associated with that location, which also had apples shown thereon. If the player has moved to the wrong space, he/she can now correct the mistake. The computer also keeps track of the card count, i.e., the number of cards in the players possession for each player (identified by color). If a player puts the correct card in the card reader slot of the computer system, then the computer system will respond with an affirmative answer and the player for each card. The software then decrements that players' card count and takes that card out of the game. If a player lands on a give/take card space then the computer system tells that player which other player to give a card to, or take a card from or to take a card from the draw pile (if there are cards remaining in the draw pile). The computer software then updates the card count for each player involved in the transaction.

When a player is at a location space, the computer system does not ask for cards which are no longer in play and asks if the player has any of the remaining cards associated with that location. If any player has provided one of his/her last two cards to another player, or inserted the card in the card slot of the computer system, then the computer system will ask that player if that was their last card. If the response is "yes", then the game is over and the player with no cards left is a winner of the game.

In order to help in understanding the game the following information is provided relating to the game, including the verbal information provided to the player:

I. PARTS 4 pawns (red, blue, green and yellow)
26 cards (1 for each letter in the alphabet)

1 board with electronics module (114 words)

The game parts include a game board and 4 pawns (e.g., red, blue, green and yellow), one for each player and the player is identified during the game as red, blue, green or yellow, 26 cards (1 for each letter in the alphabet), which have means thereon for permitting the cards to be identified by the game board computer system, e.g., holes to be identified (electronics module) and a computer system having a card reader, processor, memory, power supply, voice synthesizer, amplifier and a speaker.

II. SET-UP

Shuffle cards and deal out 24 cards to all players. (12 (2 players), 8 (3 players), or 6 (4 players)). Put the 2 left-over cards in the draw pile.

Turn the power on to start the game and players then sign-in.

To begin the game, the players each select a colored pawn. The cards are shuffled and 24 cards in all are dealt out to all players (12, 8 or 6), depending if there are respectively 2, 3 or 4 players. The two cards left over, are placed in the draw pile. The computer system is then turned on, the players sign in and the play proceeds according to the instructions and information provided to each player according to that shown in the flow chart of the drawings.

III. POWER-ON 3.1. Select Skill Level:
When you depress the "ON" switch the computer will read the ENTER switch. If the enter switch is also depressed then the game will be played at the higher (hard) skill level.
3.1.1. In normal (easy) skill level mode, the computer system asks each player if he/she has a certain object.
3.1.2. In higher (hard) skill level mode, the computer system asks each player if he/she has an object that starts with a certain letter.
3.2. After the power is turned on, the following introduction occurs:
3.2.1. The computer system plays a musical tune.
3.2.2. And then greets the players by saying "Hi, I'm Bird. Let's Play".
4. Sign-In Procedure:
This game is for 1 to 4 players (red, blue, green and yellow).
4.1. The following then occurs by the computer system asking the following questions and/or making the following statements:
FIRST CHANCE:
"Is someone red?" (blue, green or yellow).
4.1.1. Enter switch hit:
Beep!"0.K., you're red". (this color is playing).
4.2.2 Enter switch NOT hit (not closed): Go to 4.2.
4.2. SECOND CHANCE:
"No one is red?" (blue, green or yellow).
4.2.1. Enter switch hit (switch temporarily closed):
Beep! "0.K., you're red". (now he/she is playing)
4.2.2. Enter switch NOT hit:
Go on to next color (this color is not playing)
5. Starting a Turn:
The computer system randomly chooses 1 to 4 or chooses a move event. Turns do not have to be balanced for each player, because there is no advantage in big numbers.
5.1. The computer system announces move as follows:

5.1.1. Normal move:
"Red, go one". (two, three or four)
"Move ahead" can randomly replace "GO" for variety.
5.1.2. The computer system describes the move event as follows:
"Red, go to the garden".
"Red, go to the jungle".
"Red, go to the farm".
"Red, go to the ocean".
"Red, go to the castle".
"Red, go to the music store".
"Red, go to the art store".
"Red, go to the house".
6. Move Verification:
VERY IMPORTANT NOTE:
The computer will keep track where each player ends his/her turn, so it will announce the results, which will confirm the player's move.
6.1. The player is supposed to landed on one of the eight locations:
6.1.1. The computer system announces the location as follows:
"You're in the garden". (Apple, Grapes, Oranges)
"You're in the jungle". (Elephant, Lion, Mouse, Zebra)
"You're in the farm". (Horse, Nest, Pig)
"You're in the ocean". (Shark, Turtle, Whale)
"You're in the castle". (Dragon, King, Queen)
"You're in the music store". (Flute, Violin, Xylophone)
"You're in the art store". (Blue, Red, Yellow Crayons)
"You're in the house". (Cat, Ice, Jar, Umbrella)
6.1.2. If all the items from this area have been turned in, then the computer system says the following: "Gosh, I already have everything from there".
6.1.3. If not, the computer system asks for a card:
Only ask for cards which have not been turned in yet.
6.1.3.1. Normal Skill Level:
The computer system randomly chooses an item from the location.
"Do you have an Apple?"
6.1.3.1.1 Correct Answer (detected by insertion a card in the card reader:
Beep! "An Apple, you're smart!"
("Super" or "Very Good" are also interchangeably used, instead of "Smart").
6.1.3.1.2. Incorrect Answer (the computer system states the following:
Beep! "Sorry, that is a cat".
6.1.3.1.3. No Answer: (either time for action runs out, or enter switch hit)
Repeat question with new item.
6.1.3.2. Higher Skill Level:
The computer system randomly chooses a letter that starts with one of the items from the garden, e.g., apple.
"Do you have something that starts with "A"?
6.1.3.2.1. Same as 6.1.3.1.1.
6.1.3.2.2. Same as 6.1.3.1.2., plus following (the computer system says):
"That starts with "C".
6.1.3.2.3. Same as 6.1.3.1.3.
6.2. Landed on a GIVE/TAKE card box:
Randomly choose between give or take. The computer keeps track of how many cards each player has.

6.2.1. Give Card (the computer system says):
"Oh boy! Give a card to red". (blue, green, yellow).
6.2.2. Take Card (the computer system says):
"Uh oh! Take a card from the pile". (1st two times) OR
"Uh oh! Take a card from red". (blue, green, yellow)
6.3. Landed on move box (the computer system says):
"Oh Boy! Move ahead one". (two, three or four)
The computer will then determine where the player should end up and continue his/her turn at 6.1.
7. End of Game:
Whenever a player has answered correctly, the computer will respond with:
"Can I have it please?"
This lets the child (player) know that he/she should turn the card into the already used card stack. If the computer determines that the player who turned the card in might be out of cards, it will ask:
"Was that you last card?"
If the enter button is not depressed, then the game will continue. If the enter button is hit (closed), then the computer will announce:
"That's great? YOU WIN?"
And the game is over.

DETAILED DESCRIPTION OF THE INVENTION

Reference should now be had to FIG. 1, which shows the game board 20 for this invention The game board has sixteen spaces, eight "location spaces" shown at 20-1, 20-2, 20-3, 20-4, 20-5, 20-6, 20-7 and 20-8, four "move again" spaces shown at 20-10, 20-11, 20-12 and 20-13, and four "give/take a card" spaces shown at 20-15 to 20-16.

Figure 2:
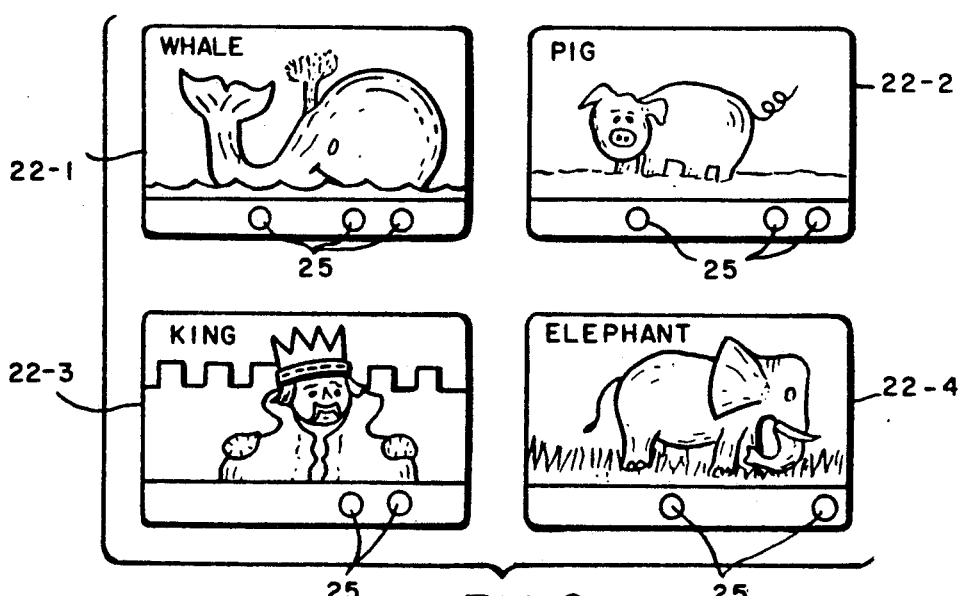
FIG. 2, is a diagram illustrating some of the cards of the talking board game.

FIG. 2 shows four of the cards 22-1, 22-2, 22-3 and 22-4 of the twenty-six cards used in the game. Each of the cards have holes 25 representing a unique code, so that the card reader 32 may identify which card is inserted in the card reader of the computer system.

Figure 3:
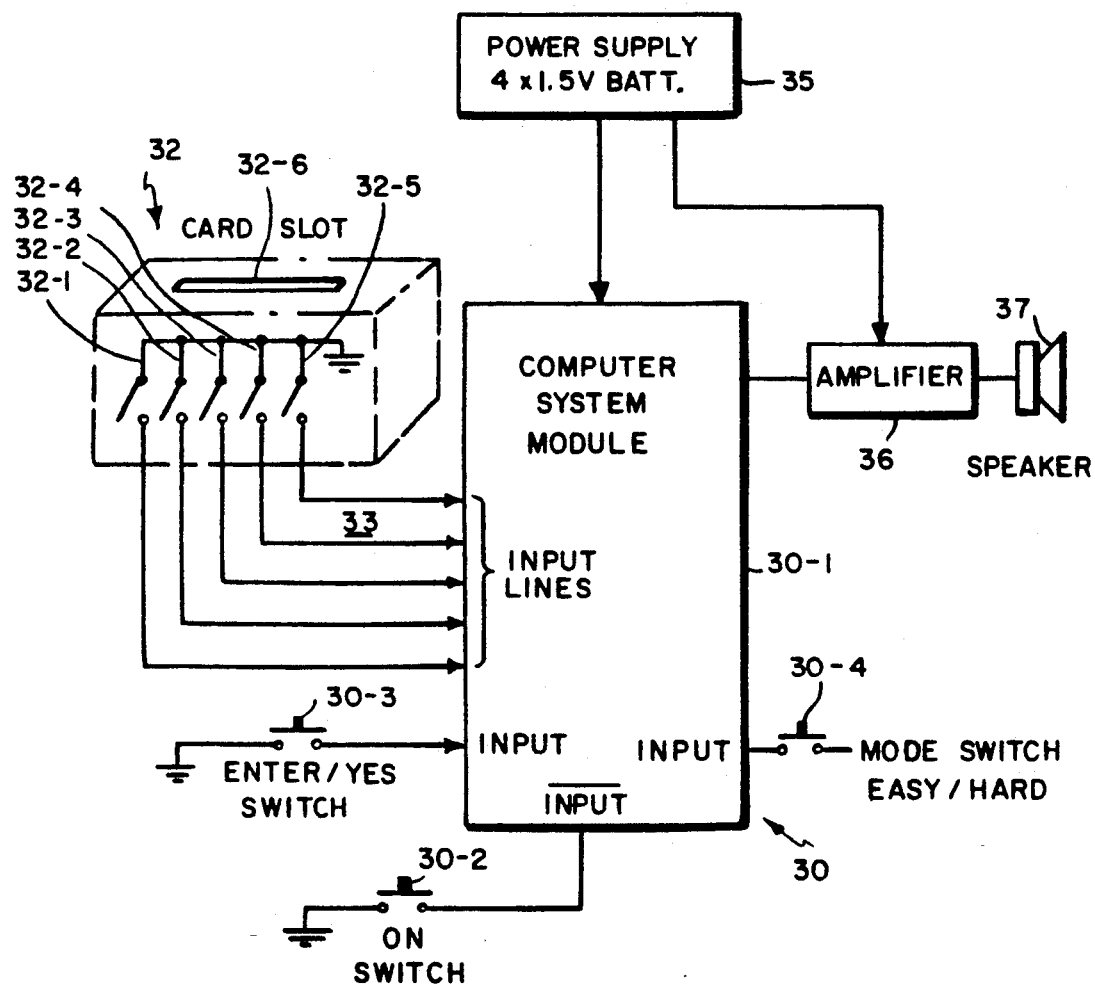
FIG. 3 is a schematic view of the computer system hardware of the talking board game to be used in conjunction with the game board and cards of FIGS. 1 and 2.

Reference should now be had to FIG. 3, which shows the computer system hardware 30 according to this invention. The computer system hardware comprises at 30-1 a processor, memory and a voice synthesizer, and the normal controls. A conventional Texas Instrument synthesizer module No. 50C11 chip may be used to provide the processor, memory, voice synthesizer and control functions. The computer system is controlled by a computer program, written in accordance with the flow chart functions as set forth in FIGS. 4 through 6.

Providing information to the processor is input switches, namely switch 30-2, which turns on the computer hardware, switch 30-3, which acts as the ENTER/yes switch, and an optional mode switch 30-4, which determines if the questions posed to the game players will be easy or hard. The switch 30-4 may normally be closed for the easy mode and be opened to instruct the module 30-1 to ask more difficult questions to the game players.

A conventional card reader 32 is provided for detecting which of the twenty-six cards 22-1, etc., are inserted into a slot 32-6, so that the presence or absence of holes 25 in the card 22-1, etc., may be sensed by the five switches 32-1 to 32-5. The switches close if the respective switch contact makes contact to the underlying switch stationary portion as is conventional. Clearly cards could be sensed using magnetic card readers as used with credit cards, optical readers and many others which are conventional in the art. The module 30-1 and a power amplifier 36 are powered by a battery unit 35. The amplifier 36 acts to amplify the electrical signal output from the voice synthesizer of the module 30-1 and a conventional speaker 37 is used to generate the audible instructions and questions posed to the players.

Figure 4:
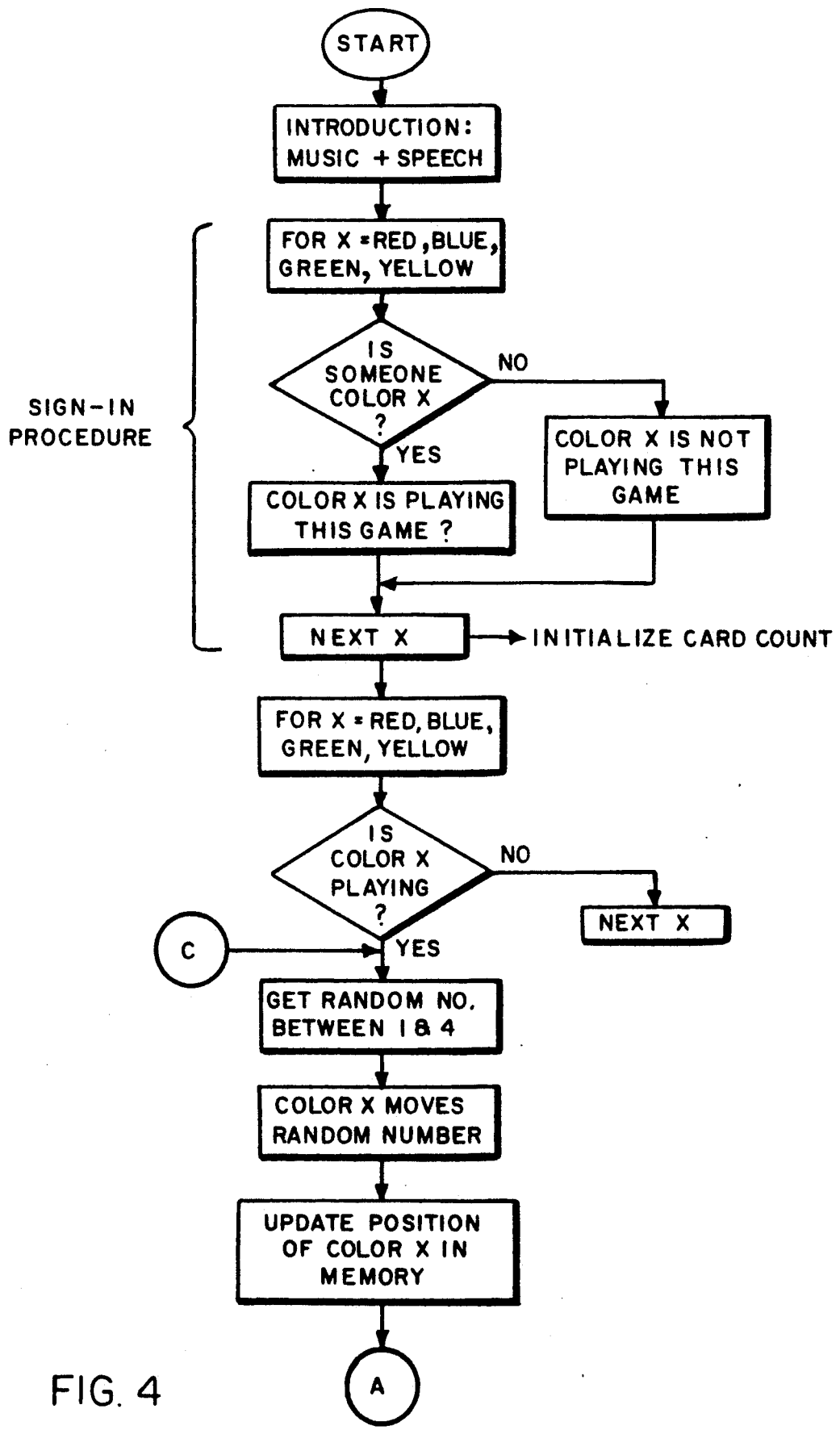
FIGS. 4 to 6, represent a flow chart representing the steps carried out by the computer system hardware of FIG. 3 and which may be implemented by a computer program stored in the computer system hardware, corresponding to the steps in the flow chart.
Figure 5:
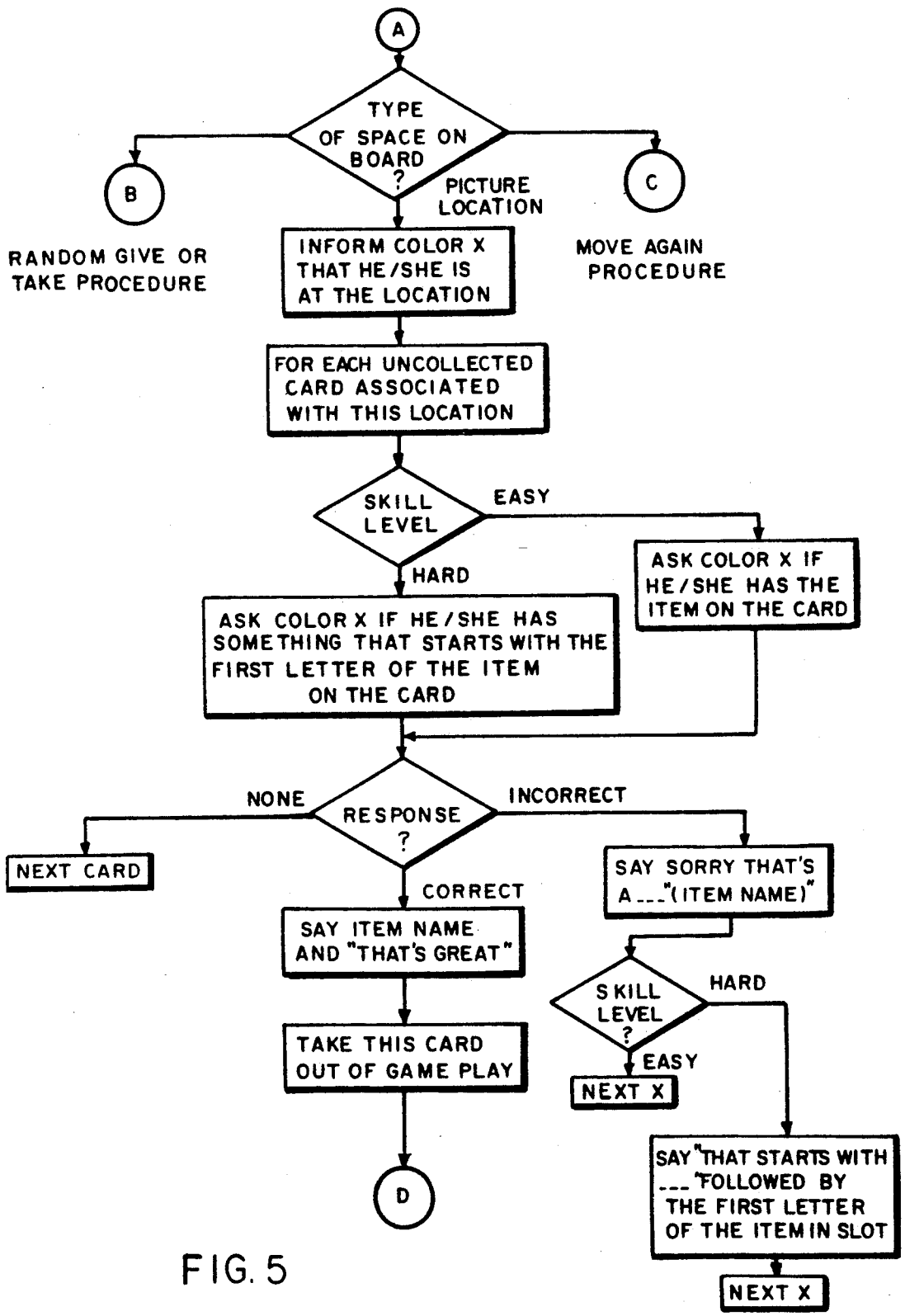
Figure 6:
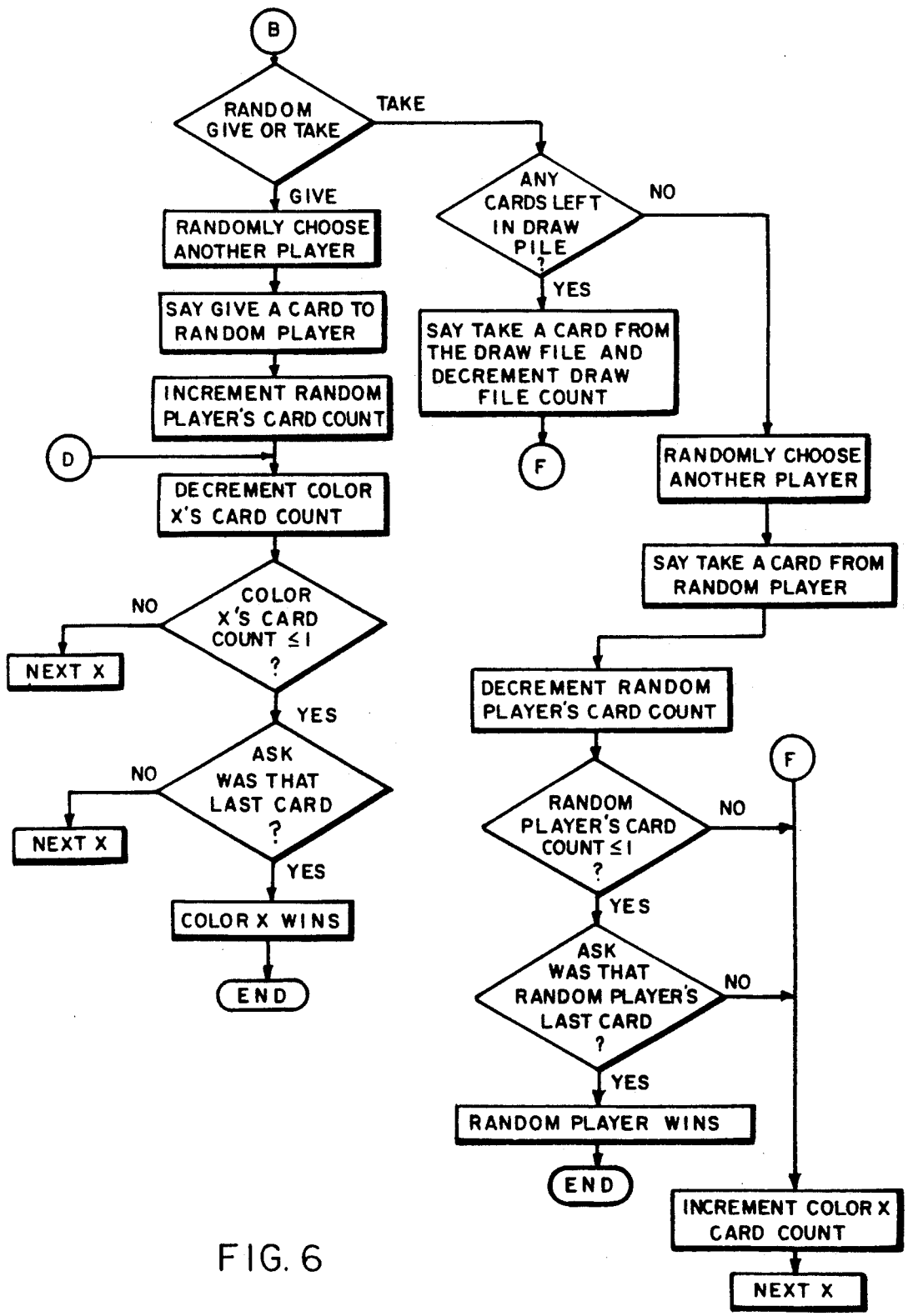

At this time, reference should now be had to FIGS. 4, 5 and 6, which depict a flow chart representing the play of the game.

The flow chart is implemented by a computer program, which is then stored (loaded) in the memory of the module 30-1 and in which the program is then implemented by the processor of the module. The program may be easily written by any person skilled in the art, as will be apparent by reviewing the flow chart.

As shown in the flow chart (FIG. 4), after the "on" switch 30-2 is turned on, the program provides introductory audible music and speech instructions directing the players in the procedures of the game (e.g., how many cards to choose, based on the number of players), how to sign on to the computer, how to select pieces and where each colored piece should initially be placed on the board locations.

Other instructions, e.g., how may cards to deal out, when to put a card in the card reader slot are also provided in written form to the players. However, when more cost effective speech hardware is available, all instructions relating to play of the game may be provided by the computer system in speech form.

The players are then asked to sign on and the sign on procedure is implemented, so the computer system will know who is playing. For example, if only two players are playing the game, the players will enter "yes" using the ENTER/yes switch 30-3 when the color they each selected has been mentioned. If no player has selected green, then switch 30-3 will remain open to indicate to the computer that no one is using green. Alternatively, a separate "NO" switch can be used to indicate that the green colored pawn is not being used. This procedure also lets the processor and memory determine the number of cards 22-1, etc., each player is supposed to have (but not the specific cards each player has) and the location on the game board where each player is to initially place the colored pawn selected.

After all the players sign "on" the computer, the play begins. The computer system 30-1 now generates a random instruction and tells the player, e.g., red to move forward or backwards 1 to 4 spaces in accordance with a random generated number. The computer then updates the position of the color "X" (e.g., red) pawn in memory. Only players who have signed "on" will be asked to move.

Turning now to FIG. 5 (A to A), the computer determines the type of space (location) on which the players, pawn should be positioned and tells the player which space the pawn should be on and allows time for the player to go to the correct position.

The computer system then determines which cards remain and which cards are associated (e.g., by picture with the particular location) and asks the player (assuming the mode switch is in the hard question mode) if he/she has a card that starts with the first letter of the item on the card (e.g., "W" in whale). Based on written game instructions (or oral instructions by Mom or Dad), the player (child) (X =color) will insert the card with the "W" into the slot of the card reader 32 (i.e., if he/she has the card asked for or thinks he/she has the card asked for).

If the card inserted is correct, then the flow chart path (D to D) is followed (see FIG. 6), and then the card is removed from the game. The players' card count is decremented and then the player is asked if that was his/her last card. If this player has no cards left, the player is a winner and the game ends. If there are cards left in the players hand, the next player takes a turn.

Now, if the situation occurs and there is no response to the question, "IF HE/SHE has something that starts with the first letter of the item of the card?" (e.g., in 5 seconds), the computer asks about another card (NONE PATHWAY). However, if the player inserts the wrong card (INCORRECT PATHWAY) in the card reader, the player is told that his/her answer is incorrect and the player (the computer does not ask for the card) retains the card. The person's turn is over and the next player is told to move.

Going back to FIG. 5, there are shown B and C pathways, which are followed if a player lands on a give and/or take spaces 20-15 to 20-18. In the pathway (B to B, see FIG. 6), the memory for the computer is decremented and/or added to reflect, which of the players (e.g., X = red pawn) gave a card and which player (X = green pawn) received a card. If a player is told to take a card (see. FIG. 6), the path shown is taken and the questions shown in the flow chart (FIG. 6) are asked depending on the "yes" or "no" answer given.

If a player pawn lands on a move again space 20-10 to 20-13, pathway C is followed (see FIGS. 4 and 5) and the player is instructed to continue to play and receives another turn.

If the easy skill level option is included in the game and used, the respective pathway shown in the flow chart (FIGS. 4 through 6) is followed. In the easy mode, the player could be asked if he/she has a specific card with, e.g., a cat on it. Now instead of having to search for a word that starts with a certain letter, the player only has to look for the item on the card.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

We claim:

1. A game comprising a game board having a plurality of defined locations, a plurality of pawns for moving on the game board one pawn for each of the game players, a plurality of cards having machine readable information thereon, said cards also containing machine readable identification information, first machine means for asking questions of the game players and directing the players to move the pawns on the game board, the second machine means for identifying the game cards by reading the machine readable information and determining if the player has selected the card having information responsive to game questions.

2. The game according to claim 1, in which said first machine means provides said instructions and questions as voice signals.

3. The game according to claim 1, in which said first machine means includes third means for keeping track of the position of each player's pawn on the game board.

4. The game according to claim 3, said first machine means including fourth machine means for producing audible reinforcing information to the players' so that they can correct their position on the board if their pawn has been moved by the player to the wrong location.

5. The game according to claim 1, in which the written information on each of the cards starts with a different letter of the English alphabet.

6. The game according to claim 1, in which said second machine means instructs the player who selected a correct card to discard the correct card.

7. The game according to claim 1, in which said second machine also keeps track of the number of cards held by each player.

8. The game according to claim 1, in which said second machine information comprises one or more holes in said cards and in which said second means includes hole detecting means for reading said holes.

9. A method of teaching information to players of a game having pawns, one for each player, a game board having a plurality of locations and a plurality of cards for each player, and machine means for directing the play of the game, said cards having machine readable information and information to assist the player in learning, said method comprising said machine audibly instructing the player to move a pawn along a game board, said machine means then audibly asking questions of said player relating to cards in the possession of said player and the determining by reading said machine means readable information if said player has a card responsive to the question asked.

10. The method according to claim 9, in which said machine means instructs said player to select a card from a pile of said cards or to take a card or give a card to another player.

11. The method according to claim 9, in which said method includes said machine means indicating to said player whether or not the player has picked a card responsive to the question asked.

12. A talking board game comprising a playing board having eight "place" locations, four "take or give a card locations" and four "play again" locations, pawns for each player to be used on the game board, a plurality of cards having machine readable information for identifying the card, a card reader and first machine means for directing the play of the game, said first means comprising second machine means for providing instructions to each player for moving a pawn on the game board, and third machine means for asking the player if the player has a card with the information thereon responsive to the question asked.

* * * * *